May 19, 1936. W. P. JACKSON 2,041,290

AGGLUTINATING TEST PLATE

Filed Jan. 12, 1935

INVENTOR
Wm. P. Jackson
BY
ATTORNEY

Patented May 19, 1936

2,041,290

UNITED STATES PATENT OFFICE 2,041,290

AGGLUTINATING TEST PLATE

William Peter Jackson, Chico, Calif.

Application January 12, 1935, Serial No. 1,540

8 Claims. (Cl. 88—14)

This invention relates to instruments for testing blood serums and is directed particularly to an agglutinating test plate.

The principal object of my invention is to provide an agglutinating test plate for testing the blood serum for Bang's disease causing abortion in cattle and other animals; the pullorum disease in fowls and other birds; and for undulant fever in human beings.

It is also my object to provide an agglutinating test plate capable of accomplishing a plurality of agglutinating tests at one time and to provide a structure whereby the person making the tests may readily take the readings of each particular test. I also provide for the test numbers and readings to be recorded directly on the device in order to prevent accidental confusion between the tests and their respective readings.

As an additional object, it is my purpose to provide an agglutinating test plate wherein the reactions will be materially magnified to the eye of the person making the test, thereby facilitating the determination of the readings of each test.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
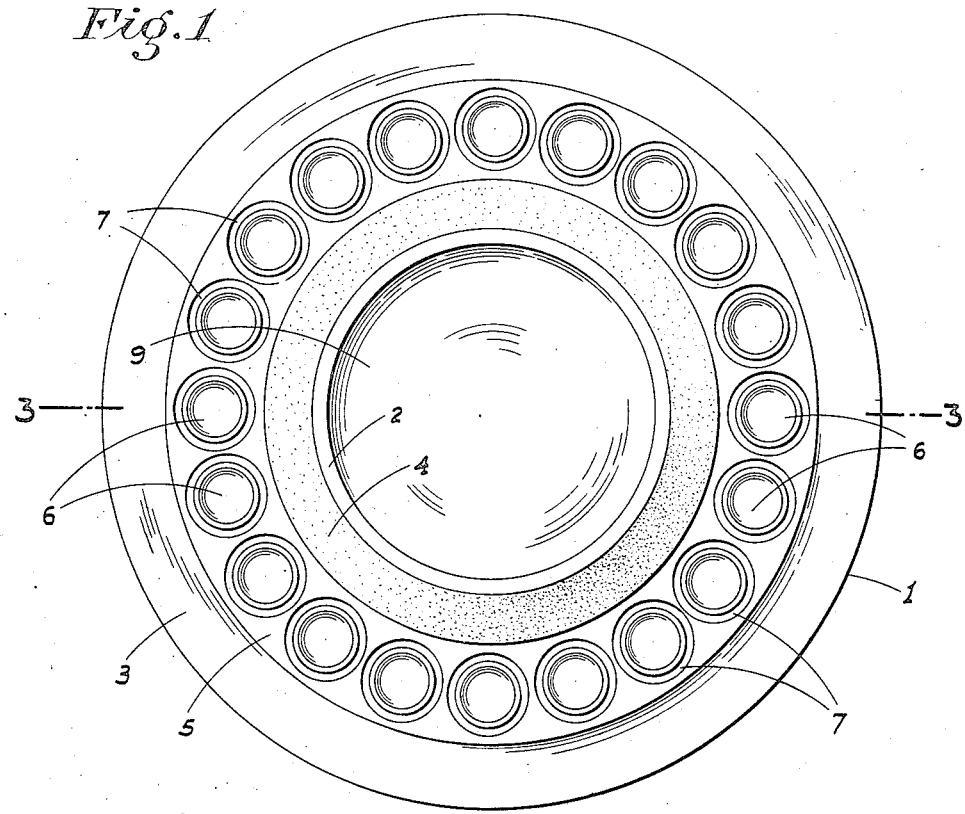
Figure 1 is a top plan of my improved agglutinating test plate.
Figure 2:
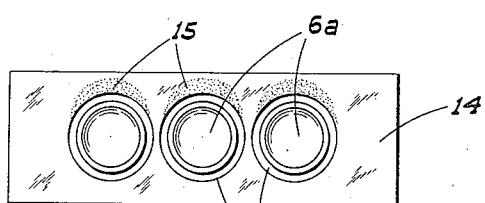
Figure 2 is a plan of the small auxiliary test plate adapted to be mounted on the main unit.

Referring now more particularly to the characters of reference on the drawings, the numeral 1 denotes a circular glass plate having an upstanding glass ring 2 on its upper surface, said ring 2 being of substantially less diameter than the circular plate 1.

The outer and upper peripheral edges of the circular glass plate 1 and the glass ring 2 are cut and ground on a bevel as at 3 and 4 respectively. The bevel surface 3 is polished after being ground while the bevel surface 4 is ground rough in order to form in effect a writing slate.

Formed in the upper surface or ledge 5 of the plate 1 outwardly of the ring 2 and spaced about said ledge is a plurality of circular concave receptacles 6. These receptacles 6 are very shallow as shown, and the entire inner surface of each one is polished after being ground.

Surrounding each receptacle 6 and spaced therefrom is a circular groove 7 of substantially the same depth as the receptacle. Adapted for removable engagement at its periphery in the groove 7 is a convex glass disc 8.

The upper face of the glass plate 1, within the ring 2, is ground and polished to form a circular concave surface 9. The lower face of the glass plate 1 is cut out, as shown, to form a circular convex surface 10 concentric with the concave surface 9. Mounted in this cut-out portion of the plate 1 is a pivotal member 11 having its upper face concaved to correspond with the surface 10 and the lower face extending downwardly to an apex 12. The lower surface of the glass plate 1, indicated at 13, and the convex surface 10 are both silvered in order to form, with the glass, mirrors or reflectors for the purpose as will hereinafter appear.

Figure 3:
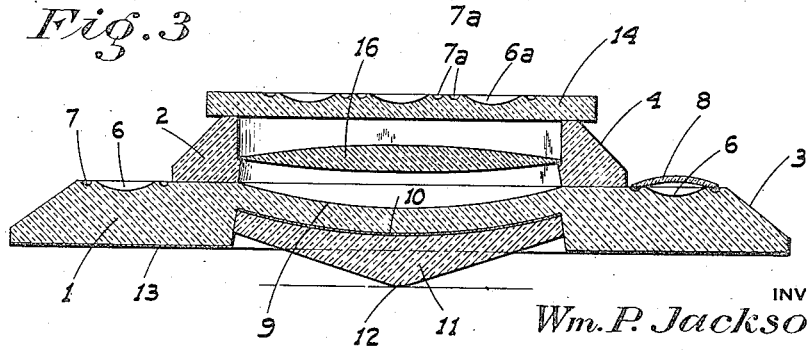
Figure 3 is a section taken on the line 3—3 of Figure 1.

Adapted to rest across the ring 2, as shown in Figure 3, is an auxiliary test plate 14 provided with receptacles 6a and grooves 7a of the same character as those formed in the main plate 1.

In use, the antigen and blood serums used in making the tests are placed in the concave receptacles 6 and mixed according to the different dilutions desired, the grooves 7 catching any overflow and preventing overflow from one receptacle to another with resultant improper mixture.

When the mixture or solution in each receptacle is complete, a convex glass disc is placed over each receptacle and engaged about its periphery in the grooves 7. This glass disc not only prevents foreign material from falling into the receptacle, but also prevents the solution from drying too rapidly.

When the solutions are all in proper receptacles the entire unit is rotated or rocked on the pivot 12 thereby causing the solutions to completely spread out over the surfaces of the receptacles.

The tests may then be made, the person making the test looking through the beveled surface 3 and seeing the agglutination reactions mirrored as well as magnified in the silvered surface 13. The concave receptacle in combination with the reflecting surface and bevel give a true, but materially magnified, image of the reaction.

As each test is made, the number of the test as well as the result is written on the beveled and roughened or etched surface 4 which serves as a slate adjacent each receptacle.

When suspected or incomplete reactions are found and it is desired to further test the solution, the solution is placed in one of the receptacles 6a of the auxiliary test plate 14 which is then placed in the ring 2 (as in Figure 3). The usual glass disc covers the receptacle. The reaction may then be seen in the concave reflecting surface 10 and here again, the image is materially magnified which facilitates taking the reading, the result of which is noted on the etched surfaces 15 provided on the plate 14 adjacent the receptacles 6a.

I have also found that superior magnification is obtained if a double convex lens 16 of the reading-glass type is placed within the ring 2 some distance above the concave surface 9 as shown in Figure 3.

The entire unit of course could be polygon shaped rather than in the form of a circle. The preferred form however is as shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An agglutinating test unit comprising a relatively thick glass plate, a circular concave receptacle formed in the upper surface of the plate, reflecting means formed on the lower surface of the plate beneath the receptacle, and an upwardly facing bevel cut in the edge of the plate adjacent the receptacle; said bevel and reflecting means being disposed relative to the receptacle so that the image of material in the concave receptacle as created in the reflecting means will be visible in magnified form through the said beveled portion of the plate.

2. An agglutinating test unit comprising a relatively thick glass plate, a circular concave receptacle formed in the upper surface of the plate, a circular groove extending about and spaced from the receptacle, a convex glass disc adapted to cover the receptacle and engage at its periphery in the groove, reflecting means formed on the lower surface of the plate beneath the receptacle, and an upwardly facing bevel cut in the edge of the plate adjacent the receptacle.

3. An agglutinating test unit comprising a relatively thick circular glass plate, an upwardly facing bevel formed in the peripheral edge of the plate, a series of circular concave receptacles formed in the upper face of the plate and in a circle concentric with the bevel and adjacent thereto, and reflection means formed on the lower face of the plate beneath the receptacles.

4. A device as in claim 2, in which the plate is formed with an upstanding ring inwardly of the series of receptacles, but adjacent thereto, and an upwardly facing bevel cut in the peripheral edge of said ring, the face of the bevel being etched.

5. An agglutinating test unit comprising a relatively thick circular glass plate, an upwardly facing bevel formed about the peripheral edge of the plate, a series of circular concave receptacles formed in the upper face of the plate, and in a circle concentric with the bevel and adjacent thereto, reflection means formed on the lower face of the plate beneath the circle of receptacles and concentric therewith, an upstanding ring formed on the upper surface of the plate concentric with but inwardly of the series of receptacles, a concave reflecting surface formed in the plate within the ring, and an auxiliary transparent glass test plate having a circular concave receptacle formed in the upper face thereof, said auxiliary test plate being adapted to rest at its ends on the ring.

6. A device as in claim 5 in which the upper face of the auxiliary test plate is formed with a circular groove which extends about and is spaced from the receptacle, and a convex glass disc adapted to cover the receptacle and engage at its periphery in the groove.

7. A device as in claim 2 with an axially located element depending from the plate and supporting the latter for universal tilting movement.

8. An agglutinating test unit comprising a circular transparent plate having a lower reflecting surface, a series of circular concave receptacles formed in the upper surface of the plate in a circle concentric with the same, and an axially located element depending from the plate and supporting the latter for universal tilting movement.

WILLIAM PETER JACKSON.